United States Patent [19]
Luttmann et al.

[11] 3,878,719
[45] Apr. 22, 1975

[54] FLUID LEVEL MONITORING DEVICE

[75] Inventors: Josef Luttmann, Ahlen; Clemens Schnuckel, Stromberg, both of Germany

[73] Assignee: Polysius AG, Neubeckum, Germany

[22] Filed: July 3, 1973

[21] Appl. No.: 376,136

[30] Foreign Application Priority Data
July 6, 1972 Germany.................................. 251504

[52] U.S. Cl. ............................ 73/304 C; 340/244 C
[51] Int. Cl. ............................................ G01f 23/26
[58] Field of Search........... 73/304 C, 291; 340/269, 340/270, 244 R, 244 C, 231; 324/60 P

[56] References Cited
UNITED STATES PATENTS
| | | | |
|---|---|---|---|
| 2,213,961 | 9/1940 | Hunter, Jr. | 340/244 C |
| 2,961,646 | 11/1960 | Whittle | 340/269 |
| 3,037,165 | 5/1962 | Kerr | 73/304 C |
| 3,176,286 | 3/1965 | Dschen | 340/269 X |
| 3,580,074 | 5/1971 | Wescott | 73/304 C |
| 3,744,314 | 7/1973 | Lenny | 73/304 C |
| 3,772,673 | 11/1973 | Szeverenyi | 340/244 R |
| R23,493 | 5/1952 | Edelman | 73/304 C |

Primary Examiner—Richard C. Queisser
Assistant Examiner—Daniel M. Yasich
Attorney, Agent, or Firm—Learman & McCulloch

[57] ABSTRACT

A device for monitoring the level of lubricating for a bearing including a capacitative measuring probe.

2 Claims, 3 Drawing Figures

FLUID LEVEL MONITORING DEVICE

FIELD OF THE INVENTION

This invention relates to a device for monitoring the level of lubricating fluid in the housing for a closed bearing whose inner bearing ring comprises a gripping cover.

BACKGROUND OF THE INVENTION

There are many closed bearings which during operation run in a bath of lubricating fluid (e.g. an oil bath) inside the bearing housing or dip into such a bath. This type of bearing is not accessible from the exterior during operation, and often runs continuously under very severe working conditions, so that it frequently happens that, through a defective sealing ring for instance, a loss of lubricating fluid occurs. When this condition is not noticed early enough, it can lead to considerable damage to the bearing which may involve considerable costs (stoppage of the machine or equipment, possibly repairs or the obtention of a new bearing). It has therefore hitherto been necessary to open the bearing housing while the machine or equipment concerned was inoperative, and in that way to check the fluid level.

The object of the invention is therefore to provide a device of the type described which permits continuous monitoring of the lubricating fluid level even during operation.

According to the invention this object is achieved in that a capacitative measuring probe is provided on the bearing gripping cover. The device in accordance with the invention utilizes the known principle that the known capacity of the measuring probe changes by a specific amount when the lubricating fluid, which has a specific dielectric constant, does or does not flow round the probe. This change in capacity then gives information on the level of lubricating fluid in the bearing housing, i.e., an indication is given of whether sufficient lubricating fluid is present in the bearing housing or whether the fluid level has dropped below a minimum value. In this way it is possible to monitor continuously the level of lubricating fluid in a closed bearing, so that excessive leakage losses are immediately noted and any consequent damage to the bearing is reliably avoided.

It is found to be very advantageous for the measuring probe to be joined by a connecting cable to an externally accessible transducer, and for this transducer to be connected to control and/or signal devices responsive to the minimum level of lubricating fluid in the bearing housing. By these means a bearing equipped with the device in accordance with the invention can operate to a considerable extent without maintenance, even under severe conditions.

Further details of the invention will appear from an embodiment as shown in the drawings wherein.

Figure 1:
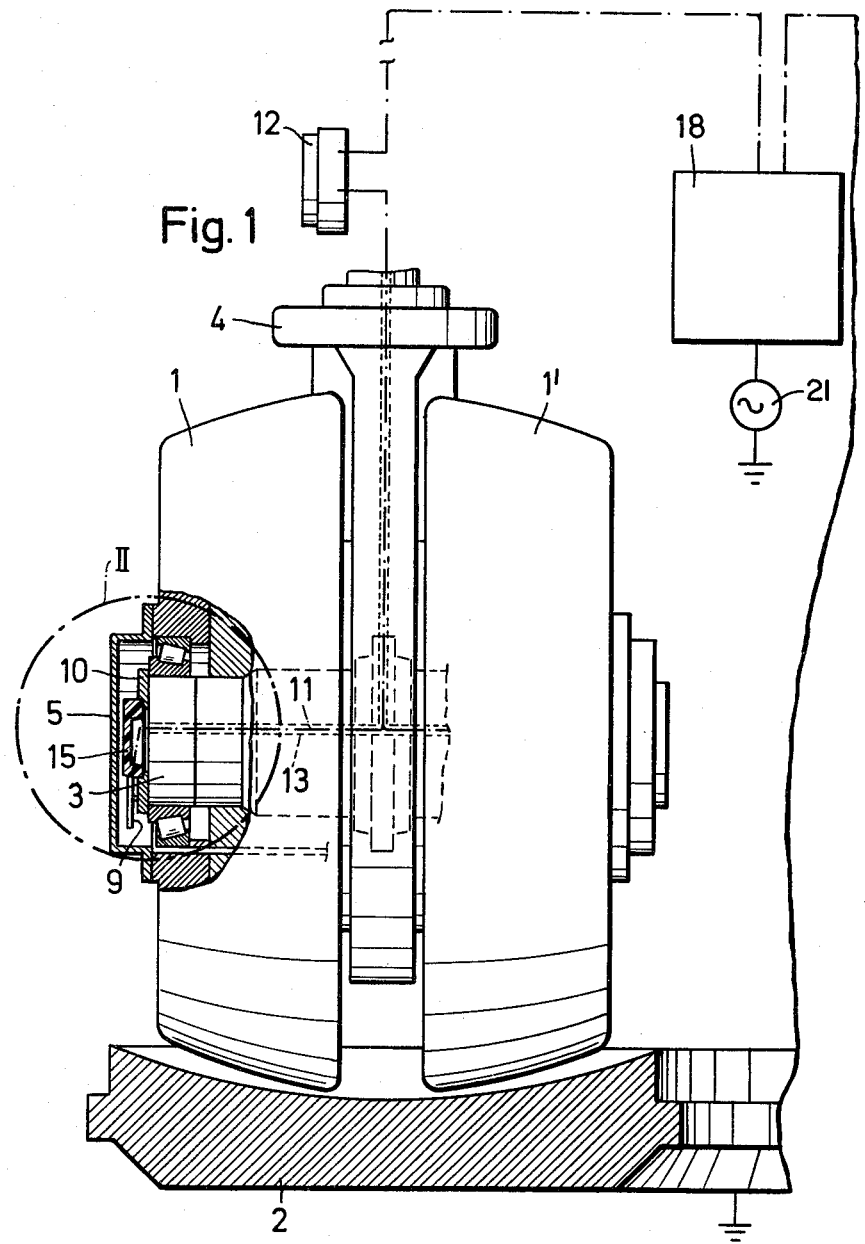
FIG. 1 is a simplified view, partly in section, of a pair of grinding rollers in a dish rolling mill, the bearing housing being provided with a monitoring device in accordance with the invention for the lubricating fluid level.

The device in accordance with the invention and shown in the drawings, for monitoring the lubricating fluid level in the housing of a closed bearing is incorporated for instance in the grinding rollers 1, 1' of a dish rolling mill, not shown in more detail. The mill rollers 1, 1' roll in manner known per se on a grinding dish 2 shown only in part. The grinding rollers 1, 1' are each mounted on one end of a fixed axle 3, which is held at its centre (between the two grinding rollers) by a holder 4, merely generally indicated. In the vicinity of each end of axle 3 is an outer housing cover 5, comprising in general the bearing housing, removably affixed in oil-tight manner to the corresponding end of the rollers 1, 1'.

The bearing 6 in the area of one end (section II in FIG. 1) of the axle 3 will be described in detail below with reference to FIG. 2; the other end of the axle 3 (with the grinding roller 1') is formed in similar manner as a mirror image.

The bearing housing contains lubricating fluid 7 (for example oil) intended for lubricating the bearing 6. To ensure optimum lubrication of bearing 6, the fluid level 8 must be kept at or above a minimum value. For this purpose there is provided in accordance with the invention a capacitative measuring probe 9 mounted on a bearing clamping or gripping cover 10 which clamps the inner ring of bearing 6 to determine its position. The measuring probe 9 is connected through a cable 11 to an externally accessible transducer 12. For guiding and holding the connecting cable 11, at least one bore 13 is provided in the fixed axle 3 and if necessary in the roller holder 4.

In order firstly to seal the cable terminal on probe 9 from oil and also to insulate the measuring part or capacitor plate 14 of the probe from the bearing housing, the probe is held on the bearing cover 10 by an intermediate insulating cover 15; the holder part 16 of measuring probe 9 extends from the periphery generally radially into the intermediate cover 15, which in this case has a conical and rather flat dish shape, with the open part of the cone facing the end of the axle.

Figure 3:
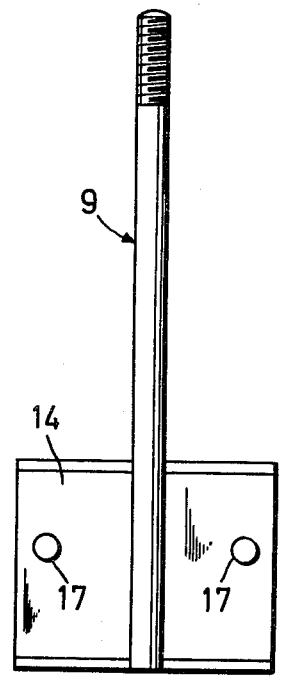
FIG. 3 is a view of an individual measuring probe.

As seen especially from FIG. 3, the measuring part or plate 14 of the probe 9 is of large area and plate shaped, with two insulating spacers 17 whereby the probe is kept at a specific distance from the bearing cover 10 which serves as another capacitor plate. These two spacers 17 also have the advantage of preventing twisting of the measuring part or plate 14 of the probe so that the distance between the plate 14 and cover 10 remains constant.

The oil bath lubrication of the grinding roller bearings can be continuously monitored with the device provided by the invention. If for instance the level 8 of the lubricating fluid in the gap between the capacitor plates 14 and cover 10 drops below a minimum value during operation of the dish rolling mill, there is a change in the dielectric between plate 14 and cover 10 and hence a change in the capacity of the measuring probe. This change in capacity is transmitted via the connecting cable 11 to the externally accessible transducer 12, so that a corresponding display can take place there. Because of this immediate indication that the lubricating fluid level is too low, immediate steps can be taken to feed liquid into the bearing housing and if necessary replace defective sealing rings or the like. In any case there is prompt prevention of the bearing suffering any damage which could lead to unwanted expense.

The transducer 12 can however also be associated with a control device 18 connected to an AC source and/or a signal device which are responsive to a minimum level of lubricating fluid in the bearing housing. The bearing housing is at ground potential. Through such devices, machines and their bearings can operate largely without maintenance even under the most severe working conditions.

Figure 2:
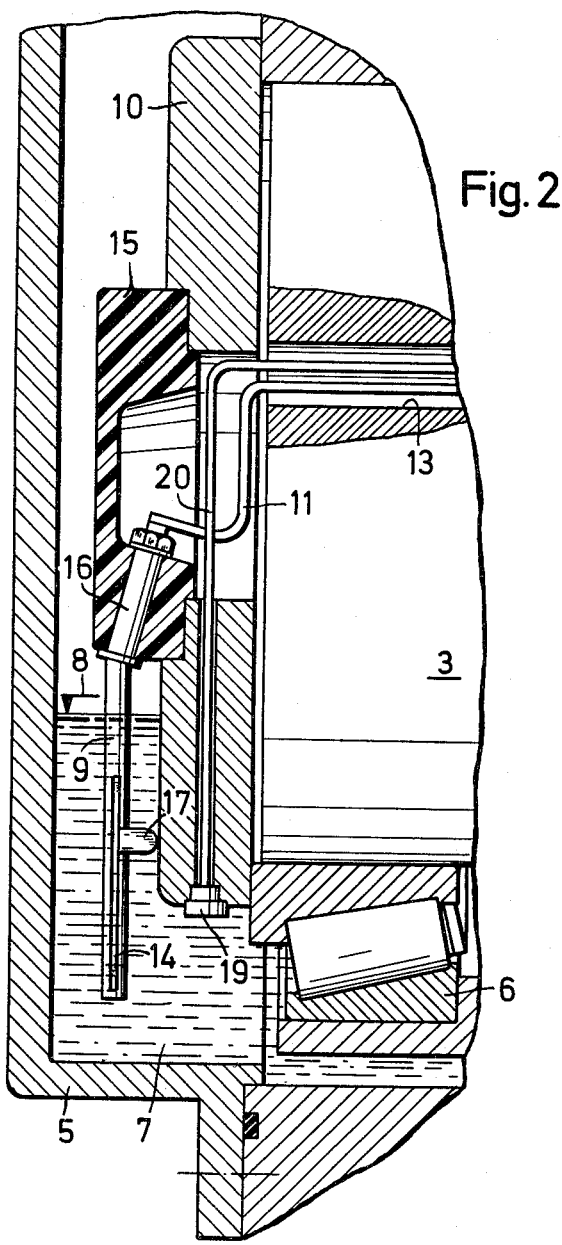
FIG. 2 is a section, on enlarged scale, of a grinding roller with a measuring probe device in the bearing.

As also seen in FIG. 2, the bearing cover 10 may also be provided with a temperature sensor 19 which is immersed in the lubricating fluid. In similar manner to probe 9 this temperature sensor can be joined by a connecting cable 20 to an external display means (not shown here). A signal device can if necessary be actuated then on overheating of lubricating fluid 7.

It is understood that the monitoring device in accordance with the invention can also be used in bearings used in machines and devices other than dish rolling mills.

What we claim is:

1. For use in combination with a closed bearing assembly comprising an axle, a bearing including an inner race fixedly mounted on said axle by a clamping cover plate and an outer race, a rotary member mounted upon said outer race for rotation upon said axle, and a closure cap sealingly secured to said rotary member to define a lubricating fluid containing chamber enclosing said bearing and said cover plate;

apparatus for monitoring the level of lubricating fluid contained in said chamber comprising a capacitative measuring probe mounted at one end on said cover plate within said chamber and having a first capacitor plate disposed in spaced parallel opposed relationship to said cover plate;

insulating spacer means carried by one of said plates and in engagement with the other of said plates for maintaining said plates spaced apart; and electric circuit means operatively connected to said first plate and said cover plate to constitute said cover plate as a second capacitor plate, the electrical capacitative reactance of said first and second plates being variable in accordance with changes in the level of lubricating fluid within said chamber.

2. Apparatus as defined in claim 1 wherein said first and second plates have flat, opposed surfaces, and wherein said spacer means comprises a pair of posts of electrical insulative material mounted on said one of said plates and projecting therefrom into engagement with the other of said plates.

* * * * *